(12) United States Patent
Wier

(10) Patent No.: US 6,416,002 B1
(45) Date of Patent: Jul. 9, 2002

(54) ASSEMBLY UNIT CONSISTING OF A BELT RETRACTOR AND A BELT TENSIONER DRIVE

(75) Inventor: Franz Wier, Göggingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/601,270

(22) PCT Filed: Dec. 18, 1998

(86) PCT No.: PCT/EP98/08349

§ 371 (c)(1),
(2), (4) Date: Jul. 28, 2000

(87) PCT Pub. No.: WO99/39944

PCT Pub. Date: Aug. 12, 1999

(30) Foreign Application Priority Data

Feb. 5, 1998 (DE) ..................... 298 01 946 U

(51) Int. Cl.[7] .............................................. B65H 75/48
(52) U.S. Cl. ...................................... 242/374; 280/807
(58) Field of Search ........................ 242/374; 280/807, 280/806; 297/475

(56) References Cited

U.S. PATENT DOCUMENTS

| 5,397,075 A | 3/1995 | Behr |
| 5,505,399 A | 4/1996 | Schmid et al. |
| 5,641,131 A | 6/1997 | Schmid et al. |

FOREIGN PATENT DOCUMENTS

| DE | 2442745 A1 | 3/1976 |
| DE | 3546637 C2 | 9/1990 |
| DE | 19508626 A1 | 9/1996 |
| EP | 0628454 A1 | 12/1994 |
| EP | 0649779 A2 | 4/1995 |
| WO | WO9507229 | 3/1995 |

*Primary Examiner*—John Q. Nguyen
(74) *Attorney, Agent, or Firm*—Tarolli, Sundheim, Covell, Tummino & SzaboL.L.P.

(57) ABSTRACT

An assembly unit consisting of a belt retractor (12) for a vehicle seat belt (16) wound on a belt reel (14) of the belt retractor (12), a belt tensioner drive (10) providing a drive energy by means of which the belt reel (14) of the belt retractor (12) can be driven in the winding direction, and a gearing (20, 24; 30, 36) coupling the belt tensioner drive to the belt reel is characterized in that the gearing (20, 24; 30, 36) provides a translation ratio which changes during a tensioning action.

6 Claims, 5 Drawing Sheets

ASSEMBLY UNIT CONSISTING OF A BELT RETRACTOR AND A BELT TENSIONER DRIVE

BACKGROUND OF THE INVENTION

The invention relates to an assembly unit consisting of a belt retractor for a vehicle seat belt wound on a belt reel of the belt retractor, a belt tensioner drive providing a drive energy by means of which the belt reel of the belt retractor can be driven in the winding direction, and a gearing coupling the belt tensioner drive to the belt reel, as is known from EP-A-0 649 779 or EP-A-0 628 454. The belt tensioner drive is activated when required by known ways and means to eliminate the so-called belt slack in the seat belt system, thus ensuring that a vehicle occupant is involved as early as possible in the deceleration of the vehicle in a crash situation.

In conventional belt tensioner drives, a pyrotechnic charge is employed which can be ignited and provides compressed gas acting on either a translatory shiftable piston or a rotary piston. The movement of the piston is transmitted in a suitable way to the belt reel so that the latter is turned in the winding direction. A gearing may be arranged between the tensioner drive and the belt reel.

It is problematic in the case of known belt tensioners that on commencement of the tensioning action, i.e. shortly after activation of the pyrotechnic charge, the components involved in the tensioning action are subjected to extremely high accelerations. Due to the mass inertia forces acting in this case which then need to be overcome, the components involved in transmitting the force from the piston to the belt reel are made of high-strength steel. This is a drawback as regards both weight and cost.

BRIEF SUMMARY OF THE INVENTION

The invention provides an assembly unit consisting of a belt retractor and a belt tensioner drive, in which the loads on the components in the course of belt tensioning can be influenced in such a way that extreme values are avoided. This is achieved in accordance with the invention by the gearing being a gearwheel system comprising a driving gear and a driven gear and providing a translation ratio which changes during a tensioning action. In such a gearing a variable translation is achievable which can be adapted to individual requirements by employing toothing pitch circles deviating from the conventional round shape. Providing for a variable translation permits influencing the conversion of the drive energy made available by the pyrotechnic charge into rotation of the belt reel in such a way that the loads on the components involved in transmitting the force are significantly reduced. It is particularly of advantage when the translation ratio—starting from the value existing at commencement of the tensioning action—increases at least initially during the tensioning action. Due to the initially comparatively low translation ratio, a particularly low loading of the components involved in the force transmission is achieved at commencement of belt tensioning. The later increase in translation, however, ensures that in effort at least the same tensioning performance as in conventional systems is achieved. Reducing the loading on the components enables light metal or even plastics to be used as the material for the gearwheels used in the gearing, this resulting in, apart from weight savings and reductions in cost, also reduced mass inertia which further improves tensioning performance.

In accordance with a preferred alternative embodiment of the invention it is provided for that between the belt tensioner drive and the belt reel, the gearwheel system and a rack and pinion gear are arranged coupled in series, the rack and pinion gear consisting of a rack forming the input side of the gearing and of a pinion forming the output side of the gearing, that the toothing of the rack is curved relative to its direction of movement and that the pinion is eccentrically mounted with regard to the pitch circle of its toothing. Such a rack and pinion gear which basically is known from U.S. Pat. No. 5,397,075, permits by particularly simple means to transmit the drive energy made available, for example, by a linear drive, with a variable translation ratio to the belt reel. The rack may be configured to advantage on the outer surface area of the piston of such a linear drive. By combining the rack and pinion gear with the gearwheel system, each of which providing a variable translation ratio, the translation ratio as a whole can be adapted to the individual requirements in an even larger range.

Further advantageous aspects of the invention read from the sub-claims.

BRIEF DESCRIPTION OF THE DRAWINGS

The invention will now be described in detail with respect to the attached drawings in which.

DETAILED DESCRIPTION OF THE INVENTION

Figure 1:
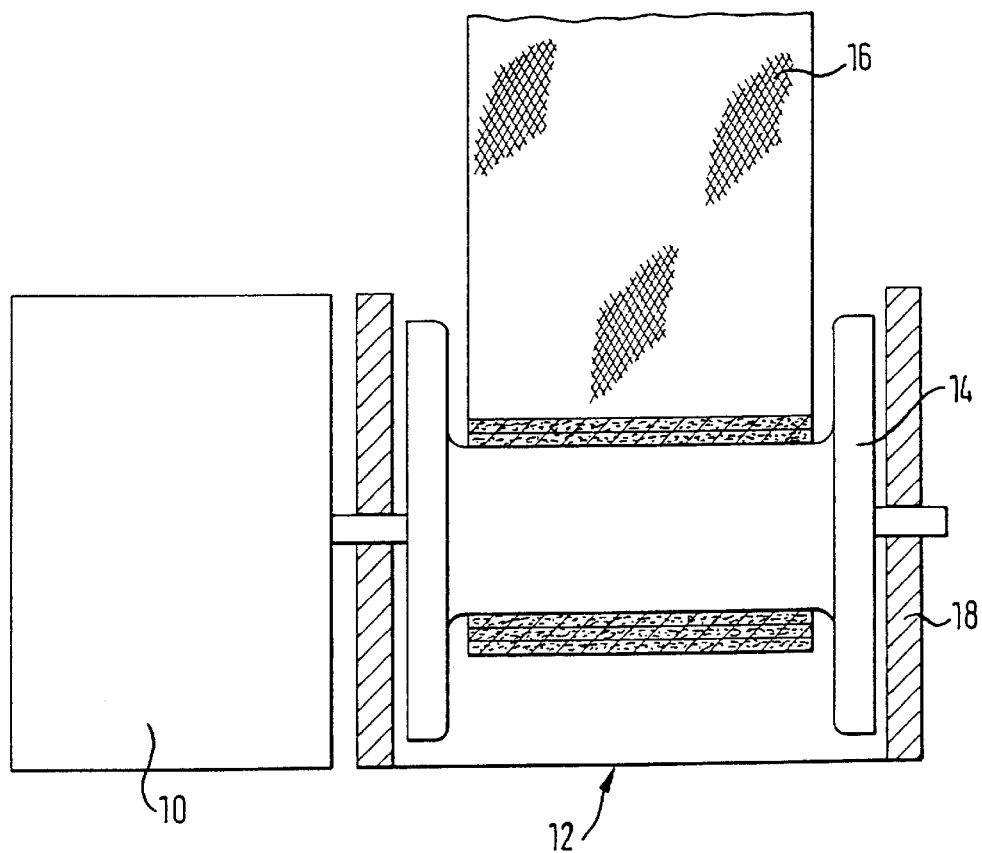
FIG. 1 is a schematic view of an assembly unit consisting of a belt retractor and a belt tensioner drive.

Referring now to FIG. 1 there is illustrated schematically an assembly unit in accordance with the invention, consisting of a belt tensioner drive 10 coupled to a belt retractor 12 depicted schematically. The belt retractor 12 comprises a belt reel 14 on which the vehicle seat belt 16 can be accommodated. The belt reel 14 is rotatably mounted in a frame 18.

Figure 2:
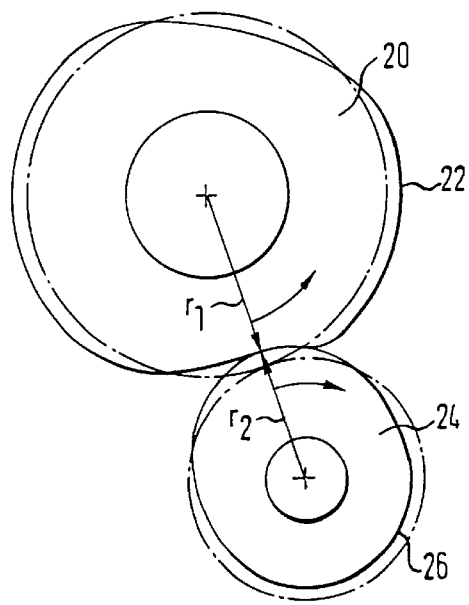
FIG. 2 is a schematic view of a gearing in accordance with a first embodiment in the starting position, which can be employed in the belt tensioner drive as shown in FIG. 1 and contains a driving gear and a driven gear.

Referring now to FIG. 2 there is illustrated a gearing in accordance with a first embodiment in a starting position prior to a tensioning action, arranged between the belt tensioner drive 10 and the belt reel 14. The gearing contains a gearwheel 20 representing the input side of the gearing and serving to receive the drive power provided by the belt tensioner drive, i.e. for example, a rotational movement of a rotary piston acted upon by a pyrotechnic charge. The gearwheel 20 comprises a toothing symbolized by its pitch circle 22 comprising two flattened portions in which the radius of the pitch circle is smaller than in the remaining portions. To highlight the out of round profile of the pitch circle 22, a circular pitch circle as employed in the case of conventional gearings is depicted in a broken line.

Meshing with the toothing of the driving gear 20 is a gearwheel 24 representing the output side of the gearing and being connected to the belt reel 14. The driven gear 24 is provided with a toothing symbolized by a pitch circle 26 comprising a portion in which the radius of the pitch circle is greater than in the remaining portions. Here too, to highlight the out of round profile of the pitch circle 26, the circular pitch circle as employed in the case of conventional gearings is depicted as a broken line.

In the position shown, corresponding to the position of the gearing at the start of a tensioning action, a radius $r_1$ of the pitch circle of the driving gear 20 exists in the pitch point. The radius of the pitch circle of the driven gear 24 in the pitch point is identified $r_2$. When the driving gear is driven out of this starting position, the radius $r_1$ of the pitch circle initially increases in the pitch point, thus achieving the desired increase in the translation ratio. Subsequently thereto, the pitch point is located in these portions of the driving gear and driven gear in which the radius remains constant. Here, the translation ratio does not alter. Finally, the pitch point comes to that portion of the driving gear in which the radius is again reduced, resulting in a reduction in the translation ratio.

Figure 3:
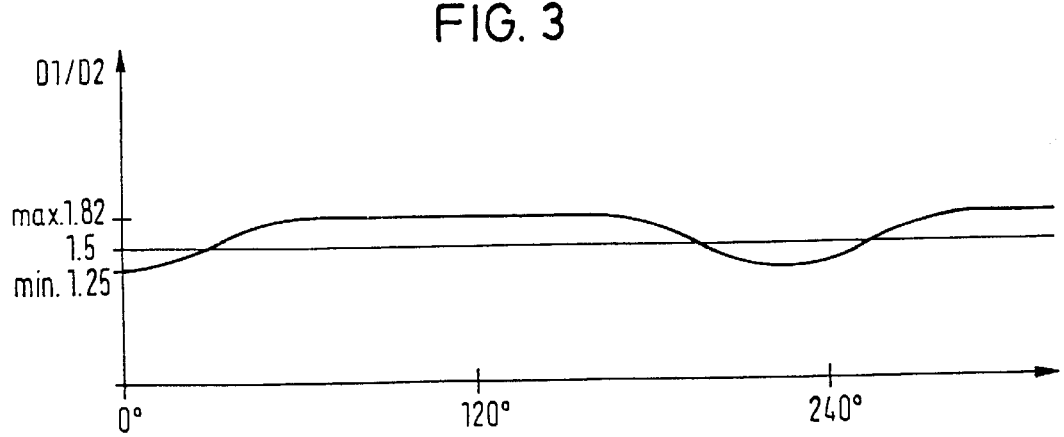
FIG. 3 is a plot of the translation ratio versus the angle of rotation, for the gearing as shown in FIG. 2.

Referring now to FIG. 3 there is illustrated the resulting profile of the translation ratio. When the driving gear rotates out of its starting position, the translation ratio increases from a value of 1.25 through an average value of 1.5 and attains a value of 1.82. This value is then constant over a certain angle of rotation until it is again reduced following rotation of the driving gear through approximately 165°. For a complete tensioning action a rotation of the driving gear through approximately 240° is exploited, the specific value-of which may, however, change as a function of individual circumstances.

Figure 4:
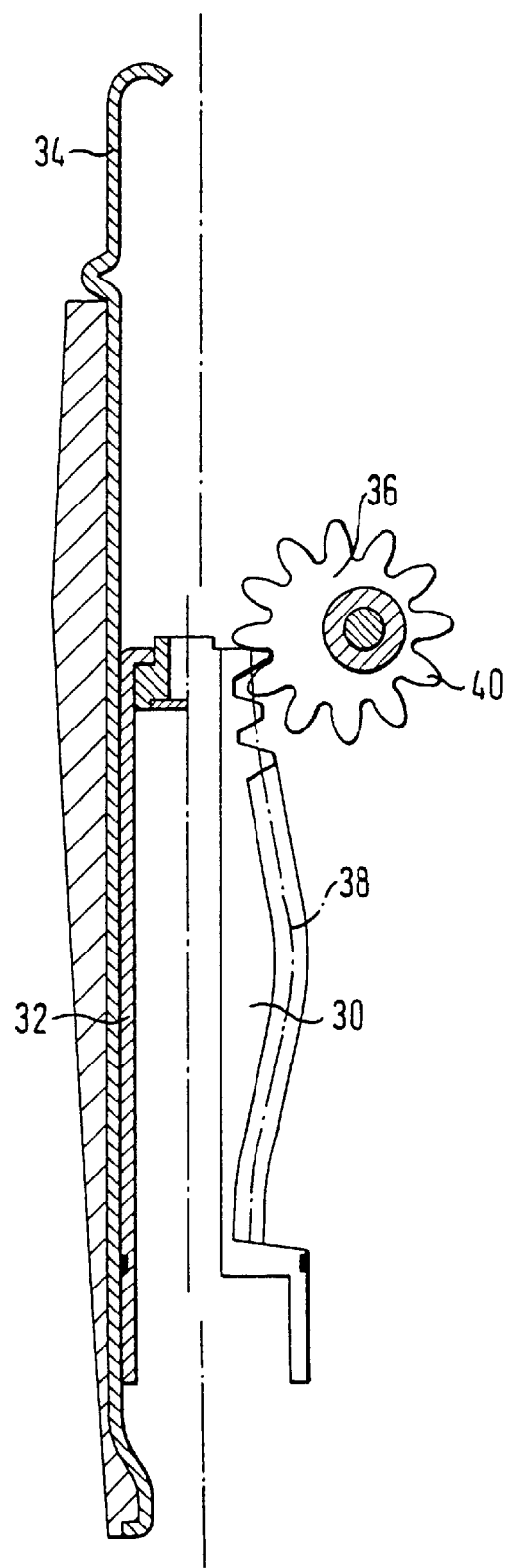
FIG. 4 is a schematic view of a gearing in accordance with a second embodiment in the starting position, which can be employed in the belt tensioner drive as shown in FIG. 1 and contains a rack and a pinion meshing therewith.

Referring now to FIG. 4 there is illustrated a gearing in accordance with a second embodiment, shown schematically in a starting position prior to a tensioning action, this gearing being arranged between the belt tensioner drive 10 and the belt reel 14. The gearing contains a rack 30 representing the input side of the gearing and serving to receive the drive power made available by the belt tensioner drive. In this embodiment the rack is arranged on the outer side of a piston 32 which is translatory shiftable in a cylinder 34. The piston and the cylinder form together a linear drive with which the energy of, for example, a pyrotechnic charge can be converted into a translatory movement. This translatory movement is converted by a pinion 36, meshing with the toothing of the rack 30 and forming the output side of the gearing, into a rotary movement which is then transmitted to the belt reel.

The toothing of the rack symbolized by its pitch circle 38 does not run parallel to the direction of displacement of the piston 32 in the cylinder 34, it instead featuring in the region of its center a greater distance from the centerline of the piston than at the beginning and the end, respectively. The driven gear comprises a toothing 40 having a circular pitch circle, but is mounted eccentrically relative thereto. In the starting position as shown in FIG. 4, the radius in the pitch point is a maximum. When the piston 32 is shifted from the starting position in the cylinder 34, the radius in the pitch point is reduced until it attains a minimum after the piston has been shifted roughly through half of the maximum stroke. On being shifted further the radius again increases.

Figure 5:
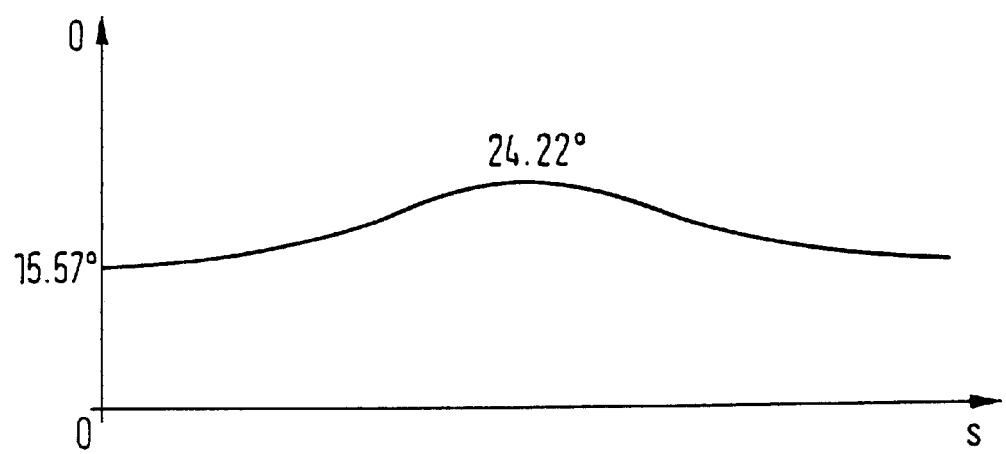
FIG. 5 is a plot of the angle of rotation of the pinion versus the travel of the rack, for the gearing as shown in FIG. 4.

Referring now to FIG. 5 there is illustrated a plot of the angle of rotation of the pinion 36 versus the travel s of the rack 38. The indicated numerical values relate to a shift of the rack 38 and pinion 32 by 3 mm in each case. Accordingly, in the starting position a shift of 3 mm of the piston 32 results in a rotation of the pinion 38 through 15.57°, this value increasing up to a value of 24.22° present roughly in the middle of the toothing of the rack.

Figure 6:
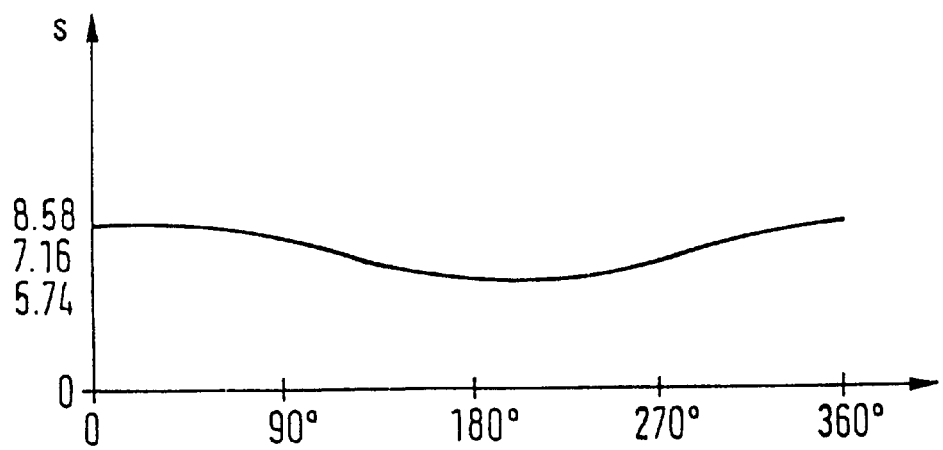
FIG. 6 is a plot of the travel of the rack versus the angle of rotation, for the gearing as shown in FIG. 4.

Referring now to FIG. 6 there is illustrated a plot of the travel s of the rack versus the angle of rotation of the pinion 36. The indicated numerical values relate to a rotation of the pinion 36 through 10° in each case. Accordingly, in the starting position a rotation of the pinion 36 through 10° results in a shift of the piston of 8.58 mm.

Figure 7:
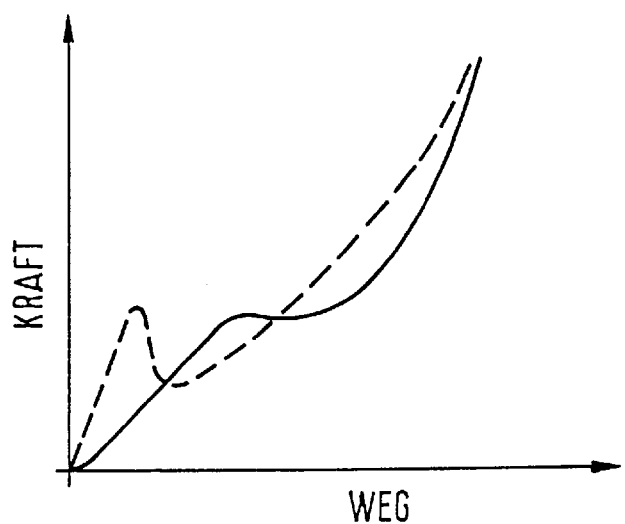
FIG. 7 is a plot of the belt webbing force achieved in a tensioning action versus the tensioned belt webbing length, for an assembly unit in accordance with the invention and for that of a conventional assembly unit.
Figure 8:
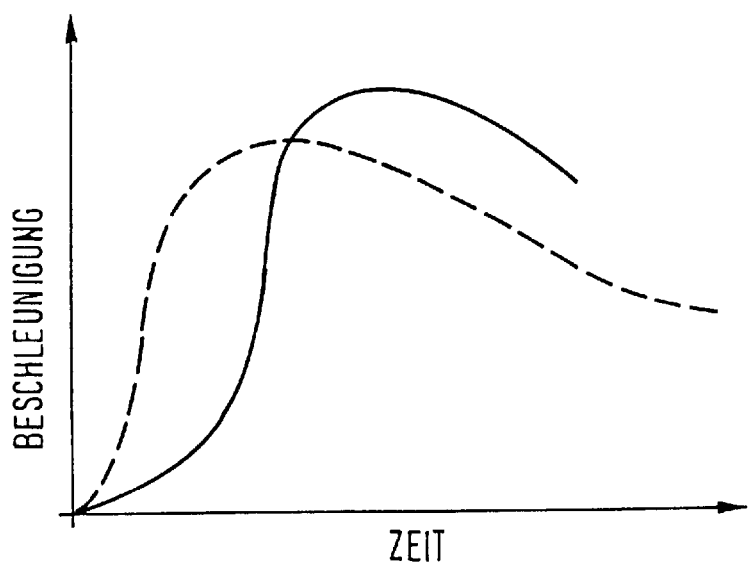
FIG. 8 is a plot of the acceleration achieved in a tensioning action versus time, for an assembly unit in accordance with the invention and for that of a conventional assembly unit.

Referring now to FIGS. 7 and 8 plots are illustrated showing the variable characteristics of the force acting in the belt webbing, and showing the acting acceleration for a belt tensioner drive in accordance with the invention and for a conventional belt tensioner drive. The solid lines indicate the characteristics of the belt tensioner drive in accordance with the invention whilst the broken lines relate to the characteristics of a conventional belt tensioner drive.

In FIG. 7 there can be seen particularly clearly the reduction of the force acting during the tensioning action in the belt webbing as compared to that of a conventional tensioning action. More particularly, in the case of the belt tensioner in accordance with the invention, the peak load occurring in conventional belt tensioners at commencement of the tensioning action is eliminated. The increase in force in the case of the belt tensioner in accordance with the invention is very much more smoother and the same belt webbing forces are attained towards the end of the tensioning action.

Referring now to FIG. 8 there is illustrated that the accelerations are significantly less in the case of the belt tensioner in accordance with the invention at commencement of the tensioning action than those in a conventional tensioning action, it not being until in the further progress of the tensioning action that the acceleration values sharply increase. However, it is in this phase of the tensioning action, when all components involved in transmitting the forces are already in motion, that high acceleration values are much less critical. It is thus for this reason that in this phase of the tensioning action a higher acceleration may also exist than with conventional belt tensioners.

What is claimed is:

1. An assembly unit, consisting of a belt retractor (12) for a vehicle seat belt (16) wound on a belt reel (14) of the belt retractor (12), a belt tensioner drive (10) providing a drive energy by means of which said belt reel (14) of said belt retractor (12) is driven in the winding direction, and a gearing (20, 24; 30, 36) coupling said belt tensioner drive to said belt reel, characterized in that said gearing (20, 24; 30, 36) is a gearwheel system comprising a driving gear (20) and a driven gear (24) and providing a translation ratio which initially increases and subsequently decreases after remaining constant during a tensioning action.

2. The assembly unit as set forth in claim 1, characterized in that the toothing of said driving gear (20) comprises a pitch circle (22), the radius of which at each point of mesh is increased initially starting from the starting position at the beginning of a tensioning action, and that in the toothing of said driven gear (24) comprises a pitch circle (26), the radius of which at each point of mesh is decreased initially starting from the starting position at the beginning of a tensioning action.

3. The assembly unit as set forth in claim 1, characterized in that said driving gear (20) and said driven gear (24) comprise a pitch circle (22, 26) which does not have a constant radius.

4. The assembly unit as set forth in claim 3, characterized in that said pitch circle (22) of said driving gear (20) comprises a constant radius except for two portions having a smaller radius than in the remaining portions and that said pitch circle (26) of said driven gear (24) comprises a constant radius except for one portion having a larger radius than in the remaining portions.

5. The assembly unit as set forth in claim 1, characterized in that at least one of said gearwheels is made of a light molecular weight metal.

6. The assembly unit as set forth in claim 1, characterized in that at least one of said gearwheels is made of plastics.

* * * * *